United States Patent [19]

Yamaguchi et al.

[11] Patent Number: 5,419,204
[45] Date of Patent: May 30, 1995

[54] FORCE MEASURING INSTRUMENT

[75] Inventors: Toshiyuki Yamaguchi, Kyoto; Akira Komoto, Shiga, both of Japan

[73] Assignee: Shimadzu Corporation, Kyoto, Japan

[21] Appl. No.: 217,736

[22] Filed: Mar. 25, 1994

[30] Foreign Application Priority Data

Mar. 26, 1993 [JP] Japan .................................. 5-067970

[51] Int. Cl.$^6$ .................................................. G01L 1/08
[52] U.S. Cl. ........................... 73/862.61; 177/210 EM; 177/212
[58] Field of Search ............. 73/862.61; 177/210 EM, 177/212

[56] References Cited

U.S. PATENT DOCUMENTS

| | | | |
|---|---|---|---|
| 3,816,156 | 6/1974 | Baumann et al. | 177/212 X |
| 4,372,406 | 2/1983 | Komoto et al. | 177/212 |
| 4,420,055 | 12/1983 | Grutzediek et al. | 177/212 |
| 4,457,386 | 7/1984 | Schett et al. | 177/210 EM X |
| 4,487,279 | 12/1984 | Komoto | 177/210 EM X |
| 4,549,623 | 10/1985 | Baumann | 177/210 EM X |
| 4,678,048 | 7/1987 | Losch et al. | 177/210 EM X |
| 5,115,877 | 5/1992 | Komoto | 177/212 |
| 5,184,690 | 2/1993 | Komoto | 177/210 EM X |

Primary Examiner—Richard E. Chilcot, Jr.
Assistant Examiner—Elizabeth L. Dougherty
Attorney, Agent, or Firm—Nikaido, Marmelstein, Murray & Oram

[57] ABSTRACT

A force measuring instrument for determining the strength of an applied force by measuring the strength of an electromagnetic force developed so as to counterbalance the applied force, the instrument including a force coil, a displacement sensor for detecting any displacement occurring on a scale balance, an analog arithmetic unit for performing PD operation of analog detecting signals sent by the displacement sensor, a pulse converter for converting the analog signal into a signal having a frequency depending upon the magnitude of the analog signal, an up/down counter for counting up or down pulse signals from the pulse converter depending upon the polarity of the analog signal, a D/A (digital-to-analog) converter for converting the number of counts by the up/down counter into an analog signal, and wherein the sum of the output of the D/A converter and the output of the analog arithmetic unit is fed back to the force coil, thereby ensuring that the counts by the counter alone are used to determine the measurements.

5 Claims, 3 Drawing Sheets

FORCE MEASURING INSTRUMENT

FIELD OF THE INVENTION

The present invention relates generally to a force measuring instrument, and more particularly to an instrument for determining the strength of an applied force by measuring the strength of an electromagnetic force developed so as to counterbalance the applied force, wherein the applied force means any load derivable from a mass, a load and a fluid pressure.

BACKGROUND OF THE INVENTION

As a typical example of the force measuring instruments an electronic balance and a diaphragm-implemented measuring instrument are known in the art, wherein the diaphragm-implemented measuring instrument means a measuring instrument having a diaphragm on which an external force such as fluid pressure is applied. These measuring instruments include a balanceable scale beam which is displaced under a force exerting on a weighing pan and a diaphragm secured to the scale beam, and in response to the displacement, an electromagnetic force is developed by a transducer having a force coil placed in the static electromagnetic field so as to compensate the displacement. The strength of the electromagnetic force is detected. At this stage no equilibrium is yet reached between the force and the electromagnetic force. The detecting result is subjected to PID operation, and then fed back to the force coil so as to obtain an optimum strength of electromagnetic force for achieving the equilibrium. In this way the applied force is determined by measuring the feedback current. The "PID" is a known symbol standing for proportionality signal (P), an integral signal (I) and a differential signal (D).

However, the known system has the following problems and disadvantages:

First, the detecting result is represented in analog quantity, and the PID operation is performed in analog. The resulting signal is fed back to the force coil, and the current flowing through the force coil is converted into analog voltage signal through a resistance, and is then digitalized by an A/D (analog-to-digital) converter. The digitalized signal is supplied to a microcomputer, and the resulting measuring value is arithmetically operated like averaging, and displayed as a mean value.

In such an analog servomechanism it is required to employ an A/D converter having a relatively large number of bits so as to achieve high precision without sacrificing the dynamic range. As a whole the system becomes expensive because of the unavoidable provision of an A/D converter having a large number of bits and a high responsibility.

Second, the resistance through which the feedback current flowing through the force coil is converted into analog voltage signal generates heat. Owing to the heat the resistance values are varies, thereby resulting in an unstable span. The force coil also generates heat which is likely to raise the temperatures of the permanent magnet in the coil. Thus the magnetostatic field becomes unstable. Unstable magnetostatic field causes drifts in the measuring values.

Third, under the known analog servomechanism the achievement of stable control requires a lower proportional gain of the system but in order to enhance resolution a higher proportional gain is required. The two requirements for stability and resolution are contradictory with each other, and cannot be satisfied at the same time.

In order to overcome these disadvantages, there is a proposal for digitalizing the whole process of PID operation but a high-speed A/D converter having a large number of bits occupies a large space and is costly.

SUMMARY OF THE INVENTION

According to the present invention, there is provided a force measuring instrument for determining the strength of an applied force by measuring the strength of an electromagnetic force developed so as to counterbalance the applied force, the instrument including a force coil, a displacement sensor for detecting any displacement occurring on a scale balance, an analog arithmetic unit for performing PD operation of analog detecting signals sent by the displacement sensor, a pulse converter for converting the analog signal into a signal having a frequency depending upon the magnitude of the analog signal, an up/down counter for counting up or down pulse signals from the pulse converter depending upon the polarity of the analog signal, a D/A (digital-to-analog) converter for converting the number of counts by the up/down counter into an analog signal, and wherein the sum of the output of the D/A converter and the output of the analog arithmetic unit is fed back to the force coil, thereby ensuring that the counts by the counter alone are used to determine the measurements.

DETAILED DESCRIPTION OF THE INVENTION

Figure 1:
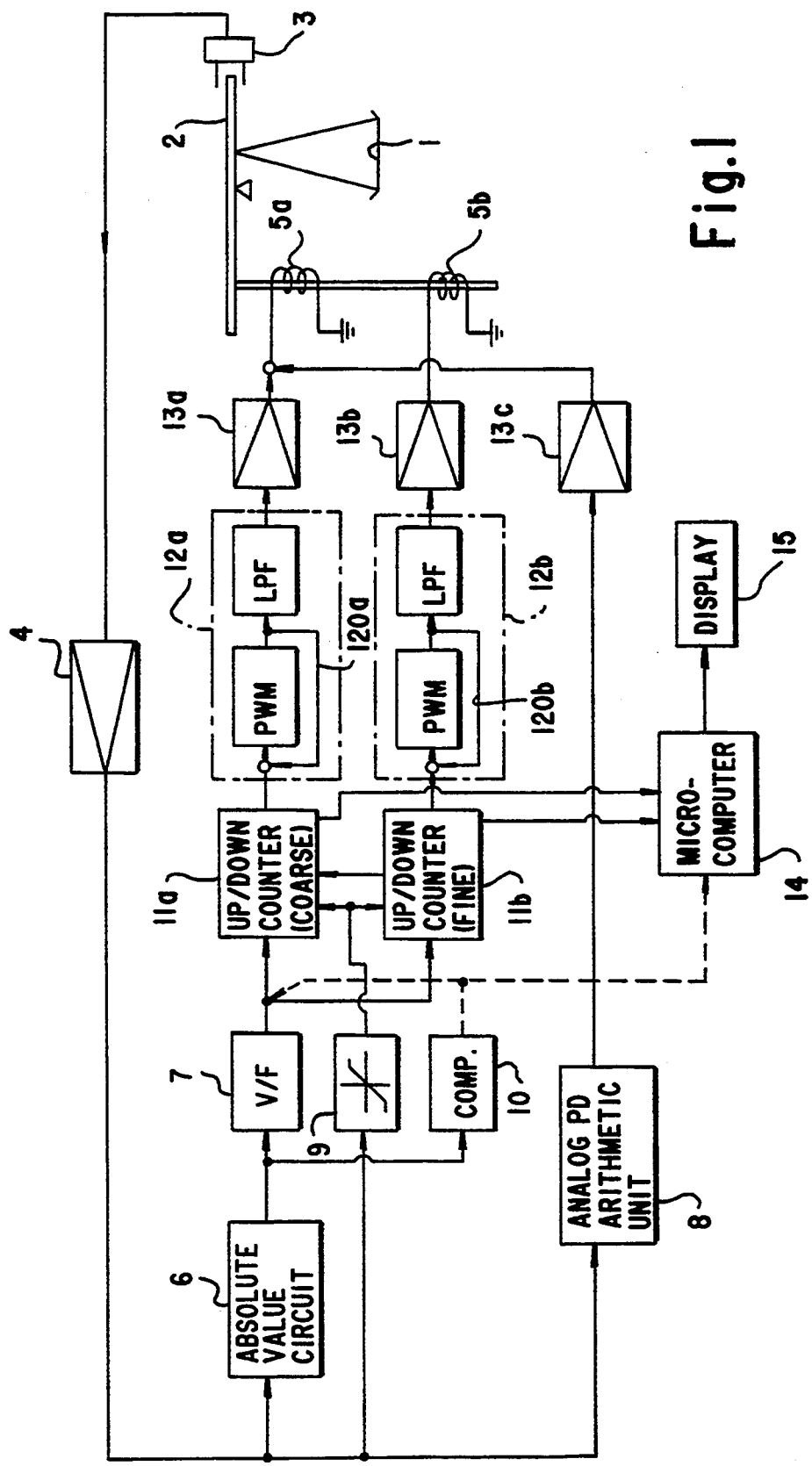
FIG. 1 is a block diagram schematically showing the circuit and the structure of a first example according to the present invention.

Referring to FIG. 1, the illustrated example is an electronic balance. The exemplary balance includes a force coil 5a for a coarse range and a force coil 5b for a fine range. A weighing pan 1 is secured to a scale beam 2 which is capable of seesawing on a pivot. The displacement of the scale beam 2 is detected by a displacement sensor 3. The analog output from the sensor 3 is amplified by a preamplifier 14, and then is sent to a circuit (described below). The analog output controls a current flowing through the force coils 5a and 5b.

The force coils 5a and 5b are placed in the magnetostatic field, and each force coil generates an electromagnetic force having a strength which depends upon the intensity of the current flowing therethrough. The electromagnetic force exerts on the scale beam 2 in an opposite direction to the applied force.

The signal output by the displacement sensor 3 is amplified by the preamplifier 4 and input to an absolute value circuit 6, an analog PD (proportionality and differential), an arithmetic circuit 8 and a zero-crossing detector 9. The output of the absolute value circuit 6 is sent to a V/F (voltage-frequency) converter 7 and a comparator 10. The V/F converter generates a pulse signal whose frequency is proportional to the modulus of the detecting value.

The pulse signal from the V/F converter 7 is sent to a coarse up/down counter 11a and a fine up/down counter 11b. Each of the up/down counters 11a and 11b is to add a pulse signal when the detecting value is positive (+) and deducts a pulse signal when the detecting value is negative (−) controls a signal detected by the zero-crossing detector 9 whereby changes in the polarity of displacement value are determined. The comparator 10 will be referred to below.

The outputs from the coarse and fine up/down counters 11a and 11b are supplied to a D/A (digital-to-analog) converters 12a and 12b using a PWM (pulse width modulator) circuit and a low-pass filter. The D/A (digital-to-analog) converters 12a and 12b each modulate the width of the signals output by the up/down counters 11a and 11b, and generate a PWM signal having a rectangular waveform having a duty which depends upon the number of signals counted. The PMW signal is cut off by the low-pass filter so as to obtain analog d.c. signals. In converting digital to analog signals, the circuits of the converters 12a and 12b are in synchronism with the counters 11a and 11b by using latch circuits 120a and 120b designed to latch any input to the PWM circuits temporarily. Without the latch circuits 120a and 120b, the counters 11a and 11b would go on counting without break which unfavorably affects the On/Off cycle for conversion. This impairs the accuracy of digital-to-analog conversion.

The analog signals from the converters 12a and 12b are subjected to voltage-current conversion by power-amplifiers 13a and 13b, and supplied to the coarse coil 5a and fine coil 5b. The coarse filter 5a, in addition to the signal from the power amplifier 13a, receives a further signal which was converted into an electric current by a third power amplifier 13c.

The comparator 10 compares an absolute value representing the displacement (hereinafter "displacement value") with a predetermined reference threshold, and the result thus obtained is used as a monitor signal which switches from the coarse range to the fine range and vice versa; more specifically, when the output from the absolute value circuit 6 exceeds the reference threshold, a pulse signal from the V/F converter 7 is supplied only to the coarse up/down counter 11a. The sum of two currents, that is, (1) a current obtained by converting an output from the coarse up/down counter 11a and (2) a current obtained by converting an output from the analog PD arithmetic unit 8 by the third power amplifier 13c is supplied to the coarse force-coil 5a alone. The resultantly generating electromagnetic force and the displacement value of the scale beam 2 in equilibrium are jointly returned to the absolute value circuit 6. Thus a coarse feedback loop is formed. When the system becomes stabilized with the situation described above being maintained, the value representing the displacement gradually comes to zero. When the displacement value falls below the threshold set by the comparator 10, the output of the absolute value circuit 6 is supplied to the fine up/down counter 11b. Thereafter, another feedback loop, that is, a fine feedback loop including the fine up/down counter 11b, the D/A converter 12b and the power amplifier 13b is executed, thus enabling the coarse and fine loops to control the system cooperatively.

While the two loops are executed, if the fine up/down counter 11b is over-charged, an overcharge signal is generated and sent to the coarse up/down counter 11a so as to count up the signals thereof.

The relationship between the LSB (least significant bit) of the coarse up/down counter 11a and the MSB (most significant bit) of the fine up/down counter 11b may be such that the electromagnetic forces generated by the force coils 5a and 5b fully match or alternatively, overlap by a few bits; in the latter case, an amount corresponding to the overlapping portion be added to the coarse up/down counter 11a.

The outputs from the coarse and fine up/down counters 11a and 11b are input to the microcomputer 14, and they are mutually subjected to weighting addition. Then the resulting values are arithmetically operated such as averaging for displaying on the indicator 15 as a measurement. The analog PD arithmetic unit 8 controls noise until the scale beam 2 is brought into equilibrium (where there is no indication of displacement), thereby maintaining the system in an optimum condition. When the system becomes stabilized, the output becomes zero, it no longer functions to determine a measuring value.

At this stage, noises occurring in the ambience around the balance should be eliminated. If noise occurs, the output of the displacement sensor B fluctuates irrespective of the fact that the applied load is static. Even after the feedback loop for the coarse range turns into the stabilized state, the displacement value does not become constant and fails to stay within the threshold. If this state is realized by an output of the comparator 10, it is required to eliminate noises so as to indicate an accurate measuring value constantly.

One of the features of the present invention is that among the PID operations the integral operation is performed in digits whereas the others are performed in analog, and that the sum of the results is used as a feedback signal and displayed as a single measuring value represented in digits. In digitalizing a signal which performs one arithmetic operation, no high-speed A/D converter is required but a V/F converter and up/down counters are used. Another feature is that to represent the results of the I operation in analog, a combination circuit of the low-pass filter and the PWM circuit operable in synchronism with the up/down counters by a cycle latch circuit is used.

According to the present invention, it is not required to use a high-speed A/D converter to digitalize the results of the I arithmetic operation. Dispensing with A/D converters can reduce production cost. In addition, the operation time can be shortened by having no time for performing the A/D conversion, thereby speeding up the display of measurements.

By setting two groups of "coarse" and "fine" ranges and selectively operating them, a wide dynamic range can be advantageously divided into a coarse loop having a large loop gain, and a fine loop having a small loop gain. Thus the resolution is enhanced.

Figure 2:
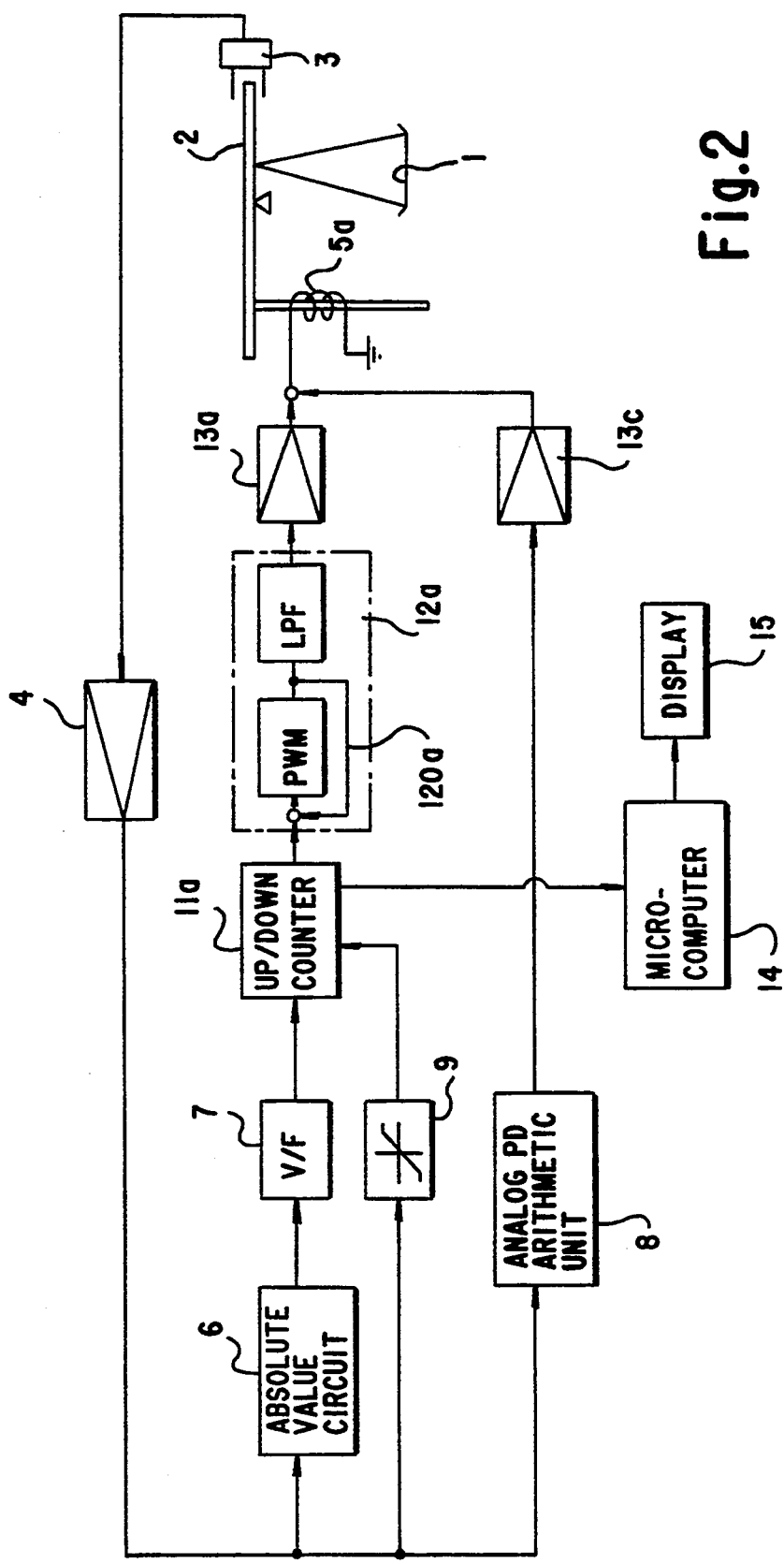
FIG. 2 is a block diagram schematically showing the circuit and the structure of a second example according to the present invention.

FIG. 2 shows a second example which demonstrates that the coarse range and the fine range are substituted by a single loop which performs the digital I arithmetic operation and also performs analog PD arithmetic operations.

The feature of the second example is in the single loop which is substantially equivalent to the coarse loop. In FIG. 2 like reference numerals designate like elements and components to those in FIG. 1 so that the description of them is omitted for simplicity. As a result of the omission of the fine loop, the comparator 10 is no longer required, and the measuring value is determined by supplying a sum of the output (current changing signal) of the D/A converter 12a and the output of the analog PD arithmetic unit 8 to a force coil 5a wherein the values to be displayed are determined by the counting of the up/down counter 11a. The circuit described above can be applied to a diaphragm-implemented balances in which a fluid pressure exerts upon the scale beam through the diaphragm.

Figure 3:
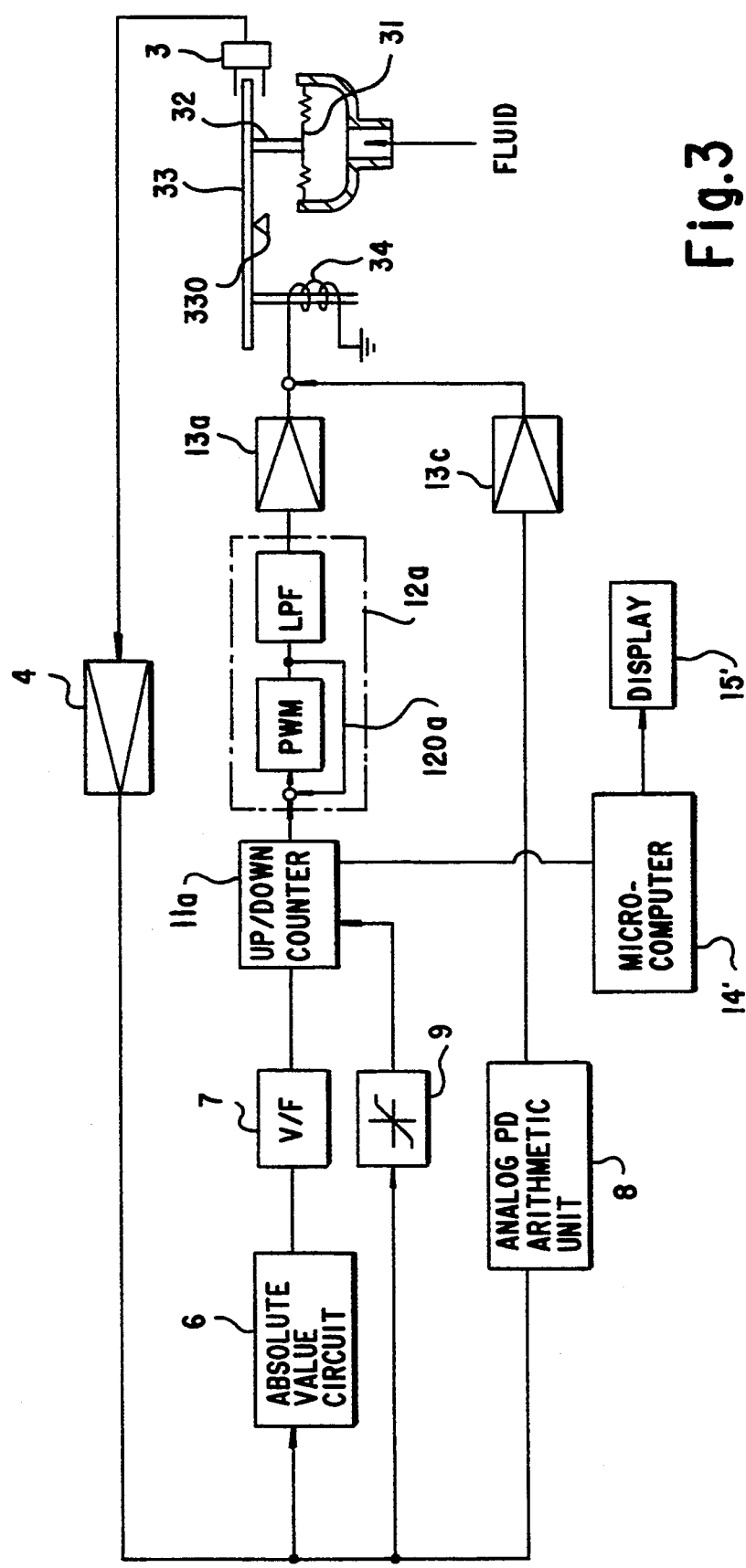
FIG. 3 is a block diagram schematically showing the circuit and the structure of a third example according to the present invention.

FIG. 3 shows a third example using a diaphragm wherein like reference numerals designate like elements and components to those in FIG. 2, the description of which will be omitted for simplicity:

The illustrated diaphragm-implemented balance includes a diaphragm 31 which is deformed in accordance with the magnitude of fluid pressure exerting thereupon. The diaphragm 31 is secured to a scale beam 33 through a connecting bar 32 in such a manner as to allow the beam 33 to seesaw on a pivot 330. When fluid pressure is applied to the diaphragm 31, the scale beam 33 declines in accordance with the deformation of the diaphragm 31.

The displacement of one end of the scale beam 33 is detected by a displacement sensor 3, and an analog signal is supplied to a preamplifier 4, and the subsequently arranged elements and components are the same as those described with respect to FIG. 2. The other end of the scale beam 33 is secured to a force coil 32. The current flowing through the force coil 34 is controlled in accordance with the amount of the displacement of the scale beam 33.

The force coil 34 is placed in a static electromagnetic field, and when a current flows through the force coil 34, an electromagnetic force is generated in accordance with the intensity of the current. The electromagnetic force works in opposite direction to the direction in which the pressure exerts on the diaphragm 31.

Under this structure the feedback loop subsequent to the absolute value circuit 6, and the feedback loop subsequent to the analog PD arithmetic unit 8 each control a current flowing through the force coil 34 so as to constantly bring the scale beam 33 into equilibrium irrespective of any magnitude of the fluid pressure exerting on the diaphragm 31. The current flowing through the force coil 34 at equilibrium depends upon the magnitude of fluid pressure exerting on the diaphragm 31. The relations between them are stored in a microcomputer 14'.

The microcomputer 14' takes in the results counted by the up/down counter 11a, and the value is represented in terms of fluid pressure in the above-mentioned relationship. The finally determined value is displayed on a display 15'. The result of the I arithmetic operation is digitalized without the use of a high-speed A/D converter. This example also has the advantages of economy, stability, and responsibility.

It is of course possible to provide a diaphragm-implemented balance with the same coarse feedback loop and fine feedback loop as those in the first example.

What is claimed is:

1. A force measuring instrument for determining the strength of an applied force by measuring the strength of an electromagnetic force developed so as to counterbalance the applied force, comprising:
   a force coil;
   a displacement sensor for detecting any displacement occurring on a scale balance;
   an analog arithmetic unit for performing PD operation of analog detecting signals sent by the displacement sensor;
   a pulse converter for converting the analog signal into a signal having a frequency depending upon the magnitude of the analog signal;
   an up/down counter for counting up or down pulse signals from the pulse converter depending upon the polarity of the analog signal;
   a D/A (digital-to-analog) converter for converting the number of counts by the up/down counter into an analog signal;
   an amplifier for amplifying the analog signal from the displacement sensor: and
   an absolute value circuit and a zero-crossing detector, wherein the output of the absolute value circuit is converted into a pulse signal by a V/F (Voltage-to-frequency) converter, the zero-crossing detector detects any change in the polarity of the analog signal, and the up/down counter is controlled in accordance with the polarity changes detected by the zero-crossing detector, and wherein the sum of the output of the D/A converter and the output of the analog arithmetic unit is fed back to the force coil, thereby ensuring that the counts by the counter alone are used to determine the measurements.

2. The force measuring instrument according to claim 1, wherein the D/A converter comprises a pulse width modulator, a low-pass filter, and a latch circuit, wherein the PWM circuit (pulse width modulator) inputs the signals output by the up/down counter, and the low-pass filter inputs the signals of the PWM circuit, and the latch circuit latches the PWM circuit from outputting temporarily so as to synchronize the modulation of the PWM modulator with the counting by the counter.

3. The force measuring instrument according to claim 1, wherein the up/down counter and the D/A converter are provided in two pairs, one pair constituting a coarse loop and the other pair constituting a fine loop, wherein the sum of the outputs of the D/A converters for the two loops and the outputs of the analog arithmetic unit is fed back to the force coil, and further comprising means for assessing the magnitude of an absolute value of an analog signal of the displacement sensor so as to determine whether the assessed result falls in or out of a reference threshold, wherein if the assessed result is above the threshold, the pulse signal from the pulse converter is sent to the coarse up/down counter alone, and if the assessed result is below the threshold, the pulse signal is sent to the coarse and fine up/down counters, and to determine a measuring value, the results counted by the coarse and fine up/down counters are used after they are subjected to weighting addition.

4. The force measuring instrument according to claim 1, further comprising a balance mechanism including a scale beam and a weighing pan secured to the scale beam, and wherein a force to be measured is given by a load placed on the weighing pan, the measuring value being indicated by mass or by weight.

5. The force measuring instrument according to claim 1, further comprising a balance mechanism including a scale beam and a diaphragm secured thereto for receiving fluid pressure, a displacement occurring on the scale beam being detected by the displacement sensor, and the force to be measured is given by the fluid pressure received on the diaphragm, the measuring value being indicated in pressure.

* * * * *